(12) United States Patent
Jeon et al.

(10) Patent No.: US 8,982,183 B2
(45) Date of Patent: Mar. 17, 2015

(54) METHOD AND APPARATUS FOR PROCESSING A MULTIVIEW VIDEO SIGNAL

(75) Inventors: Yong Joon Jeon, Seoul (KR); Jae Hyun Lim, Seoul (KR); Byeong Moon Jeon, Seoul (KR); Seung Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 13/264,826

(22) PCT Filed: Dec. 30, 2009

(86) PCT No.: PCT/KR2009/007943
§ 371 (c)(1),
(2), (4) Date: Jan. 10, 2012

(87) PCT Pub. No.: WO2010/120033
PCT Pub. Date: Oct. 21, 2010

(65) Prior Publication Data
US 2012/0147137 A1    Jun. 14, 2012

Related U.S. Application Data

(60) Provisional application No. 61/170,114, filed on Apr. 17, 2009, provisional application No. 61/171,441, filed on Apr. 21, 2009, provisional application No. 61/171,793, filed on Apr. 22, 2009, provisional application No. 61/171,852, filed on Apr. 23, 2009.

(51) Int. Cl.
*H04N 13/00* (2006.01)
*H04N 19/00* (2014.01)
(Continued)

(52) U.S. Cl.
CPC ....... *H04N 7/26946* (2013.01); *H04N 7/26015* (2013.01); *H04N 7/26244* (2013.01);
(Continued)

(58) Field of Classification Search
CPC .................. H04N 19/00769; H04N 19/00139; H04N 19/00545; H04N 7/26872
USPC ........................................................... 348/43
See application file for complete search history.

(56) References Cited

U.S. PATENT DOCUMENTS 7,710,462 B2 * 5/2010 Xin et al. ................... 348/218.1
7,817,866 B2 * 10/2010 Yang ............................. 382/233
(Continued)

FOREIGN PATENT DOCUMENTS

KR  10-2007-0111880 A   11/2007
KR  10-2008-0077430 A   8/2008
(Continued)

OTHER PUBLICATIONS

PCT International Search Report dated Aug. 20, 2010 for PCT/KR2009/007943, with English translation, 6 pages.
(Continued)

*Primary Examiner* — Sath V Perungavoor
*Assistant Examiner* — Howard D Brown, Jr.
(74) *Attorney, Agent, or Firm* — Fish & Richardson P.C.

(57) ABSTRACT

A method for processing a multi-view video stream includes receiving the multi-view video stream including a random access picture, the random access picture including a random access slice referring to slices existing at a same time in a different view only, receiving identification information indicating that the received multi-view video stream is a stereo video bitstream, obtaining flag information indicating whether the random access picture is used for inter-view prediction based on the flag information, determining initialization information of a reference picture list of the random access picture based on the flag information, initializing the reference picture list of the random access picture using the initialization information, determining a prediction value of a macroblock in the random access picture based on the initialized reference picture list, and decoding the macroblock using the prediction value of the macroblock.

11 Claims, 8 Drawing Sheets

(51) Int. Cl.

| | |
|---|---|
| *H04N 19/102* | (2014.01) |
| *H04N 19/176* | (2014.01) |
| *H04N 19/174* | (2014.01) |
| *H04N 19/189* | (2014.01) |
| *H04N 19/573* | (2014.01) |
| *H04N 19/61* | (2014.01) |
| *H04N 19/597* | (2014.01) |
| *H04N 21/2365* | (2011.01) |
| *H04N 21/845* | (2011.01) |
| *G06K 9/36* | (2006.01) |

(52) U.S. Cl.
CPC ....... *H04N7/26265* (2013.01); *H04N 7/26313* (2013.01); *H04N 7/366* (2013.01); *H04N 7/50* (2013.01); *H04N 19/00769* (2013.01); *H04N 21/2365* (2013.01); *H04N 21/8451* (2013.01); *H04N 21/8455* (2013.01)
USPC .......................................... 348/43; 382/233

(56) References Cited

U.S. PATENT DOCUMENTS

| | | | |
|---|---|---|---|
| 2007/0109409 A1 | 5/2007 | Yea et al. | |
| 2007/0177671 A1 | 8/2007 | Yang | |
| 2007/0177672 A1 | 8/2007 | Yang | |
| 2007/0177673 A1 | 8/2007 | Yang | |
| 2007/0177674 A1 | 8/2007 | Yang | |
| 2007/0177810 A1 | 8/2007 | Yang | |
| 2007/0177811 A1 | 8/2007 | Yang | |
| 2007/0177812 A1 | 8/2007 | Yang | |
| 2007/0177813 A1 | 8/2007 | Yang | |
| 2009/0296811 A1* | 12/2009 | Jeon et al. | 375/240.12 |
| 2009/0310676 A1 | 12/2009 | Yang | |
| 2010/0046619 A1* | 2/2010 | Koo et al. | 375/240.12 |
| 2010/0111169 A1* | 5/2010 | Jeon et al. | 375/240.12 |
| 2012/0250769 A1* | 10/2012 | Bross et al. | 375/240.16 |
| 2012/0269275 A1* | 10/2012 | Hannuksela | 375/240.25 |

FOREIGN PATENT DOCUMENTS

| | | |
|---|---|---|
| WO | WO 2007/081178 A1 | 7/2007 |
| WO | WO 2007114609 A1 * | 10/2007 |
| WO | WO 2008/008133 A2 | 1/2008 |
| WO | WO 2010118686 A1 * | 10/2010 |

OTHER PUBLICATIONS

European Search Report dated Oct. 1, 2012 for Application No. 09843409, 8 pages.

JVT: "Joint Multiview Video Model (JMVM) 1.0", Joint Video Team (JVT) of ISO/IC MPEG & ITU-T VCEG(ISO/IEC JTC1/SC29/WG11 and ITU-T SG16 Q6), XX, XX, No. JVT-T208, Jul. 15, 2006, pp. 1-24, XP002464353, sections 3.1 and G.8.2.

Merkle P. et al.: "Efficient Prediction Structures for Multiview Video Coding", IEEE Transactions on Circuits and Systems for Video Technology, IEEE Service Center, Piscataway, NJ, US, vol. 17, No. 11, Nov. 1, 2007, pp. 1461-1473, XP011195138, ISSN: 1051-8215, DOI: 10.1109/TCSVT. 2007.903665 (the whole document).

* cited by examiner

FIG. 5

| S510 | seq_parameter_set_mvc_extension() { |
|------|--------------------------------------|
| S520 | if( profile_idc !=STEREO PROFILE){ |
| S530 | num_views_minus1 |
|      | } ⋮ |

FIG. 6

| S610 | seq_parameter_set_mvc_extension() { | C | Descriptor |
|---|---|---|---|
| S620 | num_views_minus1 | 0 | ue(v) |
|  | for( i = 0; i <= num_views_minus1; i++ ) |  |  |
| S630 | view_id[i] | 0 | ue(v) |
|  | for( i = 1; i <= num_views_minus1; i++ ) { |  |  |
| S641 | num_anchor_refs_l0[i] | 0 | ue(v) |
|  | for( j = 0; j < num_anchor_refs_l0[i]; j++ ) |  |  |
| S642 | anchor_ref_l0[i][j] | 0 | ue(v) |
| S643 | if(profile_idc != STEREO PROFILE{ |  |  |
| S644 | num_anchor_refs_l1[i] | 0 | ue(v) |
|  | for( j = 0; j < num_anchor_refs_l1[i]; j++ ) |  |  |
| S645 | anchor_ref_l1[i][j] | 0 | ue(v) |
|  | } |  |  |
|  | } |  |  |
|  | for( i = 1; i <= num_views_minus1; i++ ) { |  |  |
| S651 | num_non_anchor_refs_l0[i] | 0 | ue(v) |
|  | for( j = 0; j < num_non_anchor_refs_l0[i]; j++ ) |  |  |
| S652 | non_anchor_ref_l0[i][j] | 0 | ue(v) |
| S653 | if(profile_idc != STEREO PROFILE){ |  |  |
| S654 | num_non_anchor_refs_l1[i] | 0 | ue(v) |
|  | for( j = 0; j < num_non_anchor_refs_l1[i]; j++ ) |  |  |
| S655 | non_anchor_ref_l1[i][j] | 0 | ue(v) |
|  | } |  |  |
|  | } |  |  |
|  | } |  |  |

FIG. 7

| | |
|---|---|
| | seq_parameter_set_mvc_extension() { |
| S710 | if( profile_idc!=STEREO PROFILE) { |
| | num_views_minus1 |
| | for( i = 0; i <= num_views_minus1; i++ ) |
| | view_id[i] |
| | for( i = 1; i <= num_views_minus1; i++ ) { |
| | num_anchor_refs_l0[i] |
| | for( j = 0; j < num_anchor_refs_l0[i]; j++ ) |
| | anchor_ref_l0[i][j] |
| | num_anchor_refs_l1[i] |
| | for( j = 0; j < num_anchor_refs_l1[i]; j++ ) |
| | anchor_ref_l1[i][j] |
| | } |
| | for( i = 1; i <= num_views_minus1; i++ ) { |
| | num_non_anchor_refs_l0[i] |
| | for( j = 0; j < num_non_anchor_refs_l0[i]; j++ ) |
| | non_anchor_ref_l0[i][j] |
| | num_non_anchor_refs_l1[i] |
| | for( j = 0; j < num_non_anchor_refs_l1[i]; j++ ) |
| | non_anchor_ref_l1[i][j] |
| | } |
| | } |
| S720 | else { |
| S730 | for( i = 0; i <= 1; i++ ) |
| S740 | view_id[i] |
| S750 | anchor_ref_flag |
| S760 | non_anchor_ref_flag |
| | } |
| | ... |
| | } |

METHOD AND APPARATUS FOR PROCESSING A MULTIVIEW VIDEO SIGNAL

TECHNICAL FIELD

The present invention relates to a multiview video signal processing technique.

BACKGROUND ART

Compression coding means a series of signal processing techniques for transmitting digitalized information via a communication circuit or saving the digitalized information in a form suitable for a storage medium. As targets of compression coding, there are audio, video, characters, etc. In particular, a technique for performing compression coding on a video is called video sequence compression. A video sequence is generally characterized in having spatial redundancy and temporal redundancy.

DISCLOSURE OF THE INVENTION

Technical Task

Accordingly, the present invention is directed to a method and apparatus for processing a multiview video signal that can substantially enhance efficiency in processing the multiview video signal.

Technical Solution

An object of the present invention is to provide a method and apparatus for decoding a multiview video signal, by which the multiview video signal may be more efficiently decoded by checking inter-view dependency based on a profile information indicating a multiview video stream.

Another object of the present invention is to provide a method and apparatus for decoding a stereo video signal, by which the stereo video signal may be more efficiently decoded by defining a profile information indicating a stereo video.

Another object of the present invention is to provide a method and apparatus for decoding a multiview video signal, by which the multiview video signal may be more efficiently decoded by defining header informations (e.g., NAL unit header information, sequence parameter information, picture parameter information, slice header information, etc.) based on a profile information indicating a stereo video.

Another object of the present invention is to efficiently code a multiview video signal by defining an inter-view prediction flag indicating whether a coded picture of a current NAL unit is used for an inter-view prediction based on a profile information indicating a stereo video.

Another object of the present invention is to efficiently code a multiview video signal by obtaining an inter-view reference information indicating an inter-view dependency relation based on a profile information indicating a stereo video and by generating and managing a reference picture list using the obtained inter-view reference information.

A further object of the present invention is to efficiently code a multiview video signal by providing a method of managing reference pictures used for an inter-view prediction based on a profile information indicating a stereo video.

Advantageous Effects

The present invention defines a profile information indicating a stereo video, thereby coding a multiview video signal more efficiently. And, the present invention defines header informations (e.g., NAL unit header information, sequence parameter information, picture parameter information, slice header information, etc.) based on a profile information indicating a stereo video, by which the number of bits to be transmitted may be decremented and by which a coding speed may be enhanced in a manner of reducing a burden of a DPB (decoded picture buffer). Moreover, the present invention uses various kinds of configuration informations on a multiview video based on a profile information indicating a stereo video, thereby enabling more efficient coding.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 5 to 7 are diagrams of syntax for limiting coding of multiview video coding informations in decoding a stereo video according to embodiments of the present invention.

BEST MODE

Figure 1:
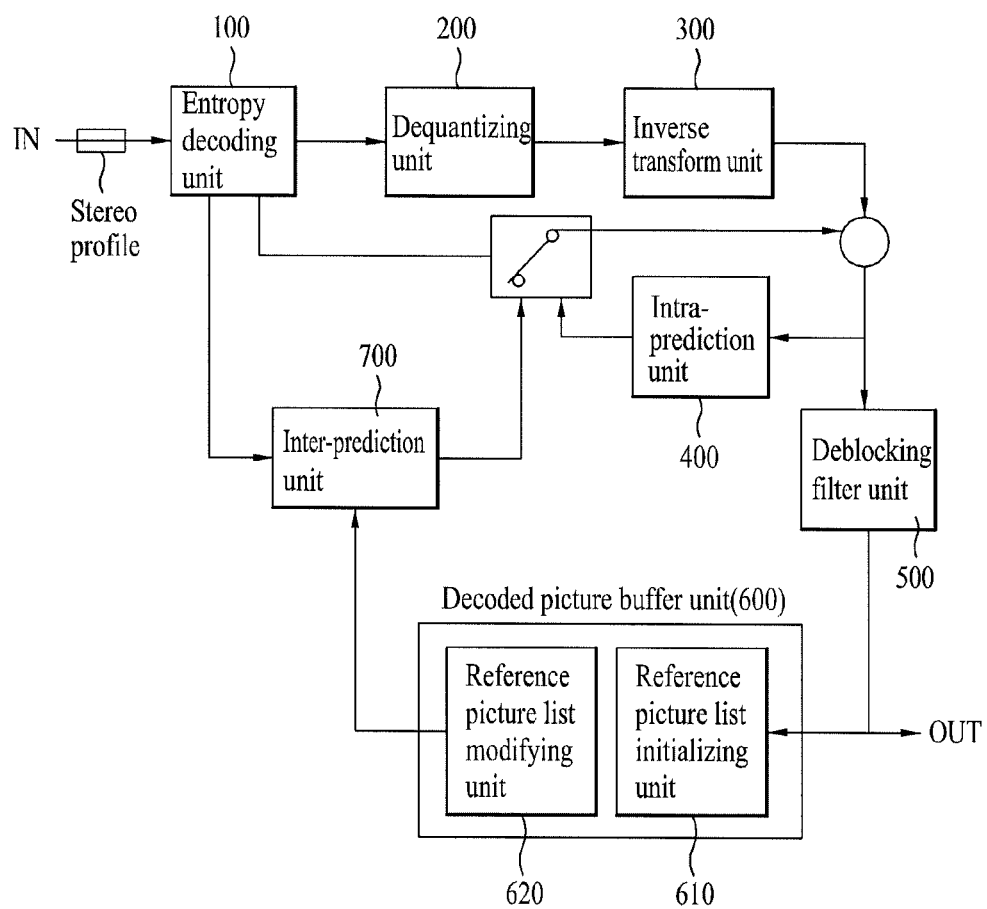
FIG. 1 is a schematic block diagram of a multiview video signal decoding apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a multiview video stream may include the steps of receiving the multiview video stream including a random access picture, the random access picture including a random access slice, the random access slice indicating a slice referring to a slice existing at a same time in a different view only, receiving an identification information indicating that the received multiview video stream is a stereo video bitstream, obtaining a flag information indicating whether the random access picture is used for inter-view prediction based on the flag information, determining an initialization information of a reference picture list of the random access picture based on the flag information, initializing the reference picture list of the random access picture using the initialization information, determining a prediction value of a macroblock in the random access picture based on the initialized reference picture list, and decoding the macroblock using the prediction value of the macroblock.

Preferably, the flag information may be obtained based on a value indicating a decoding order among a plurality of views.

Preferably, the initialization information may include a view identification information of a reference view and a count information of the reference view.

More preferably, if the random access picture is not used for the inter-view prediction in accordance with the flag information, the view identification information of the reference view may be set to the view identification information of a first-decoded view and the count information of the reference view may be set to a value indicating one.

Preferably, the flag information may be obtained from an extension region of a sequence header.

Preferably, the multiview video stream may include video data of a base view and a non-base view, the base view may indicate an independently decodable view without referring to a different view, the non-base view may indicate a view except the base view, and the macroblock may correspond to the non-base view.

To further achieve these and other advantages and in accordance with the purpose of the present invention, an apparatus for processing a multiview video stream may include an entropy decoding unit receiving an identification information indicating that the multiview video stream is a stereo video bitstream, the entropy decoding unit obtaining a flag information indicating whether a random access picture is used for inter-view prediction based on the flag information, a decoded picture buffer unit determining an initialization information of a reference picture list of the random access picture based on the flag information, the decoded picture buffer unit initializing the reference picture list of the random access picture using the initialization information, and an inter-prediction unit determining a prediction value of a macroblock in the random access picture based on the initialized reference picture list, the inter-prediction unit decoding the macroblock using the prediction value of the macroblock, wherein the multiview video stream includes the random access picture including a random access slice and wherein the random access slice indicates a slice referring to a slice existing at a same time in a different view only.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, compression coding of video signal data considers spatial redundancy, spatial redundancy, scalable redundancy, and inter-view redundancy. And, compression coding is enabled by considering inter-view existing mutual redundancy in the course of the compression coding. Compression coding scheme, which takes inter-view redundancy into consideration, is just an embodiment of the present invention. And, the technical idea of the present invention is applicable to temporal redundancy, scalable redundancy, and the like. In this disclosure, coding can include both concepts of encoding and decoding. And, coding can be flexibly interpreted to correspond to the technical idea and scope of the present invention.

Looking into a bit sequence configuration of a video signal, there exists a separate layer structure called a NAL (network abstraction layer) between a VCL (video coding layer) dealing with a moving picture encoding process itself and a lower system that transports and stores encoded information. An output from an encoding process is VCL data and is mapped by NAL unit prior to transport or storage. Each NAL unit includes compressed video data or RBSP (raw byte sequence payload: result data of moving picture compression) that is the data corresponding to header information.

The NAL unit basically includes two parts, a NAL header and an RESP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RESP trailing bit is added to a last portion of the RBSP to represent a length of the RBSP as an 8-bit multiplication. As the types of the NAL unit, there are IDR (instantaneous decoding refresh) picture, SPS (sequence parameter set), PPS (picture parameter set), SEI (supplemental enhancement information), and the like.

In the standard, requirements for various profiles and levels are set to enable implementation of a target product with an appropriate cost. In this case, a decoder should meet the requirements decided according the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier may mean an identification information indicating that an inputted bitstream is coded into a data of a specific type. For instance, the profile identifier may indicate a multiview video coded bitstream or a stereo video coded bitstream. Besides, the profile identifier may be included in a sequence parameter set.

So, in order to handle a multiview video, it needs to be identified whether an inputted bit stream relates to a multiview profile or a stereo profile. If the inputted bit stream is identified as the multiview profile, it may be necessary to add syntax to enable at least one additional information for multiview to be transmitted. If the inputted bit stream is identified as the stereo profile, a syntax for the stereo video may be transmitted or limitation may be put on a transmission of other syntax unnecessary for the stereo video coding. In this case, the multiview profile indicates a profile mode for handling multiview video as an additional technique of H.264/AVC. Since MVC is a scheme additional to a conventional AVC scheme, it may be more efficient to add syntax as additional information for a case of an MVC mode rather than unconditional syntax. For instance, when a profile identifier of AVC indicates a multiview profile, if information for a multiview video is added, it may be able to raise coding efficiency. And, the stereo profile indicates a profile mode for handling a video in 2 views as an additional scheme of H.264/AVC. In case of the stereo profile, it may be able to support interlace coding.

Sequence parameter set may indicate header information containing information crossing over encoding of an overall sequence such as a profile, a level, and the like. A whole compressed moving picture, i.e., a sequence should start with a sequence header. Hence, a sequence parameter set corresponding to header information should arrive at a decoder before the data, which will refer to the parameter set, arrives.

Namely, the sequence parameter set RBSP plays a role as the header information for the result data of the moving picture compression. Once a bit stream is inputted, a profile identifier preferentially identifies that the inputted bit stream is based on which one of a plurality of profiles. So, by adding a part for deciding whether an inputted bit stream relates to a multiview profile (e.g., 'If (profile_idc==MULTI_VIEW_PROFILE)') to syntax, it is decided whether the inputted bit stream relates to the multiview profile. Various kinds of configuration informations can be added only if the inputted bit stream is approved as relating to the multiview profile. For instance, it is able to add a count of all views, a count of inter-view reference pictures, a view identification number of an interview reference picture, and the like. And, a decoded picture buffer may be able to use various kinds of informations on an interview reference picture to create and manage a reference picture list.

FIG. 1 is a schematic block diagram of an apparatus for decoding a multiview video signal according to the present invention.

Referring to FIG. 1, the decoding apparatus may include an entropy decoding unit 100, a dequantizing unit 200, an inverse transform unit 300, an intra-predicting unit 400, a deblocking filter unit 500, a decoded picture buffer unit 600, an inter-prediction unit 700, and the like. And, the decoded picture buffer unit 600 may include a reference picture list initializing unit 610 and a reference picture list modifying unit 620.

First of all, parsing may be performed by a unit of NAL to decode a received multiview video signal. In general, at least one sequence parameter set and at least one picture parameter set may be transferred to a decoder before a slice header and slice data are decoded. In this case, various kinds of configuration informations can be included in a NAL header region or an extension region of a NAL header. Since MVC is an additional scheme for a conventional AVC scheme, it may be more efficient to add various configuration informations in case of an MVC bit stream only rather than unconditional addition. For instance, it may be able to add flag information for identifying a presence or non-presence of an MVC bit stream in the NAL header region or the extension region of the NAL header. Only if an inputted bit stream is a multiview video coded bit stream according to the flag information, it may be able to add configuration informations for a multiview video. For instance, the configuration informations may include view identification information, random access flag information, inter-view prediction flag information, temporal level information, priority identification information, identification information indicating whether it is an instantaneous decoded picture for a view, and the like. They will be explained in detail with reference to FIG. 2.

Figure 2:
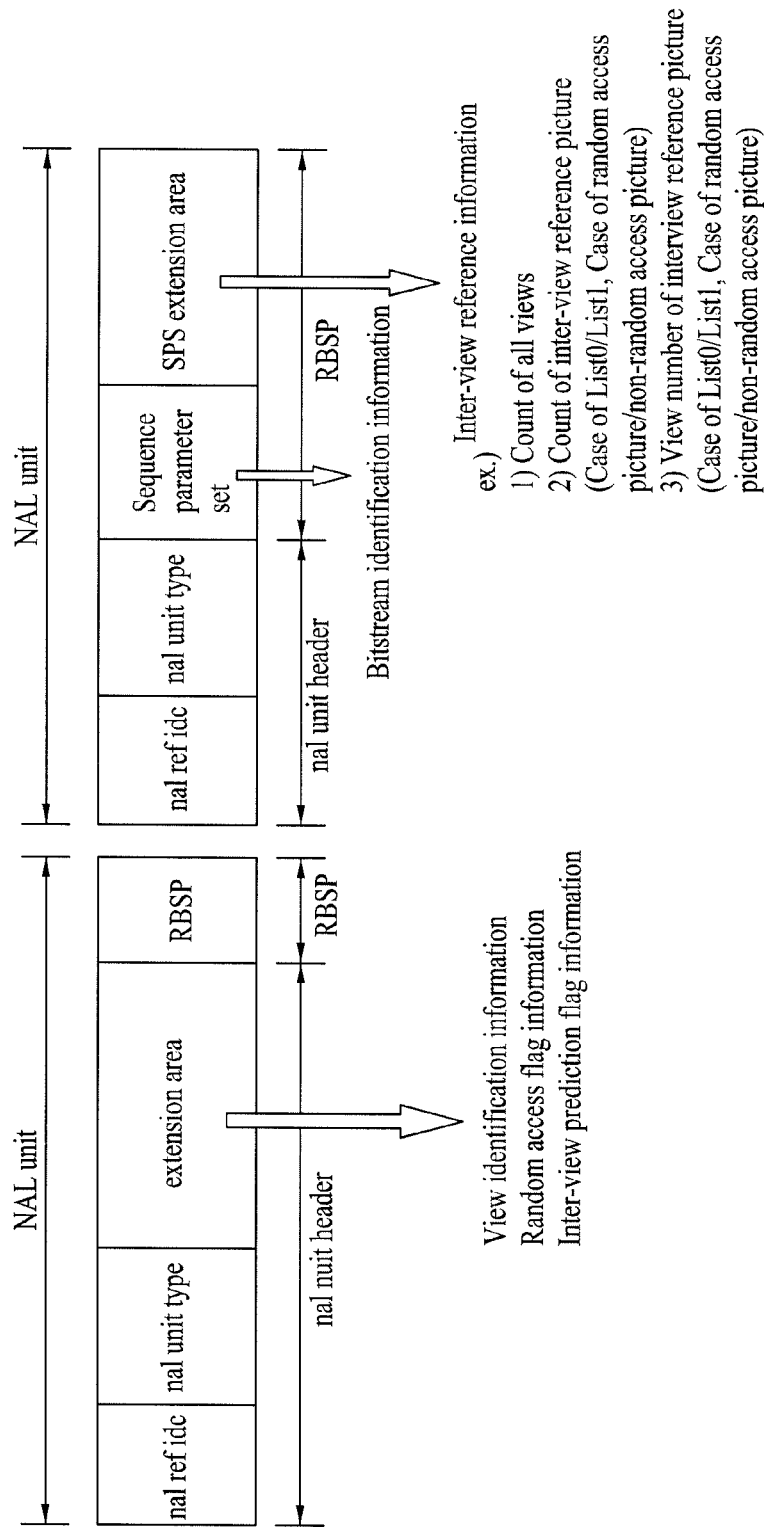
FIG. 2 is a diagram of configuration informations on a multiview video that can be added to a multiview video coded bit stream according to an embodiment of the present invention.

FIG. 2 is a diagram of configuration informations on a multiview video addable to a multiview video coded bit stream according to an embodiment of the present invention.

FIG. 2 shows an example of a NAL-unit configuration to which configuration informations on a multiview video may be added. NAL unit may mainly include NAL unit header and RBSP (raw byte sequence payload: result data of moving picture compression). And, the NAL unit header can include identification information (nal_ref_idc) indicating whether the NAL unit includes a slice of a reference picture and information (nal_unit_type) indicating a type of the NAL unit. And, an extension region of the NAL unit header can be limitedly included. For instance, if the information indicating the type of the NAL unit is associated with scalable video coding or indicates a prefix NAL unit, the NAL unit is able to include an extension region of the NAL unit header. In particular, if the nal_unit_type=20 or 14, the NAL unit is able to include the extension region of the NAL unit header. And, configuration informations for a multiview video can be added to the extension region of the NAL unit header according to flag information (svc_mvc_flag) capable of identifying whether it is MVC bit stream.

For another instance, if the information indicating the type of the NAL unit is information indicating a sequence parameter set, the RBSP can include information on the sequence parameter set. In particular, if nal_unit_type=7, the RBSP can include information for a sequence parameter set. In this case, the sequence parameter set can include an extension region of the sequence parameter set according to profile information. For example, if profile information (profile_idc) is a profile relevant to multiview video coding, the sequence parameter set can include an extension region of the sequence parameter set. Alternatively, a subset sequence parameter set can include an extension region of a sequence parameter set according to profile information. The extension region of the sequence parameter set may include inter-view reference information indicating inter-view dependency.

Various configuration informations on a multiview video, e.g., configuration informations that can be included in an extension region of NAL unit header or configuration informations that can be included in an extension region of a sequence parameter set are explained in detail as follows.

First of all, view identification information means information for discriminating a picture in a current view from a picture in a different view. In coding a video sequence signal, POC (picture order count) and 'frame_num' are used to identify each picture. In case of a multiview video, inter-view prediction may be performed. So, identification information to discriminate a picture in a present view from a picture in another view is needed. Thus, it is necessary to define view identification information for identifying a view of a picture. The view identification information may be obtained from a header region of a video signal.

For instance, the header region may include a NAL header region, an extension region of a NAL header, or a slice header region. Information on a picture in a view different from that of a current picture is obtained using the view identification information and it may be able to decode the video signal using the information on the picture in the different view. This view identification information may be applicable to an overall encoding/decoding process of the video signal. For instance, view identification information may be used to indicate inter-view dependency. Count information of inter-view reference pictures, view identification information of an inter-view reference picture and the like may be needed to indicate the inter-view dependency. Like the count information of the inter-view reference pictures and the view identification information of the inter-view reference picture, informations used to indicate the inter-view dependency may be called inter-view reference information. In this case, the view identification information may be used to indicate the view identification information of the inter-view reference picture. The inter-view reference picture may mean a reference picture used in performing inter-view prediction on a current picture. And, the view identification information may be intactly applied to multiview video coding using 'frame_num' that considers a view instead of considering a specific view identifier.

Random access flag information may mean information capable of identifying whether a coded picture of a current NAL unit is a random access picture. In this case, the random access picture may mean a coded picture that only refers to a slice in a frame in which all slices exist on a same time zone.

For instance, it may mean a coded picture that refers to a slice in a different view only but does not refer to a slice in a current view. In a multiview video decoding process, an inter-view random access may be possible. For inter-view prediction, inter-view reference information may be necessary. In obtaining the inter-view reference information, random access flag information may be usable. For instance, if a current picture corresponds to a random access picture, inter-view reference information on the random access picture may be obtained. If a current picture corresponds to a non-random access picture, it may be able to obtain inter-view reference information on the non-random access picture.

Thus, in case that inter-view reference information is obtained based on random access flag information, it may be able to perform an inter-view random access more efficiently. This is because inter-view reference relation between pictures in a random access picture may differ from that in a non-random access picture. And, in case of a random access picture, pictures in a plurality of views may be referred to. For instance, a picture of a virtual view is generated from pictures in a plurality of views and a current picture may be predicted using the picture of the virtual view.

In constructing a reference picture list, the random access flag information may be used. In this case, the reference picture list may include a reference picture list for inter-view prediction. And, the reference picture list for the inter-view prediction may be added to the reference picture list. For instance, in case of initializing a reference picture list or modifying the reference picture list, the random access flag information may be used. And, it can be also used to manage the added reference pictures for the inter-view prediction. For instance, by dividing the reference pictures into a random access picture and a non-random access picture, it may be able to make a mark indicating that reference pictures failing to be used in performing inter-view prediction shall not be used. And, the random access flag information may be applicable to a hypothetical reference decoder.

Inter-view prediction flag information may mean information indicating whether a coded picture of a current NAL unit is used for inter-view prediction. The inter-view prediction flag information may be usable for a part where temporal prediction or inter-view prediction is performed. In this case, identification information indicating whether NAL unit includes a slice of a reference picture may be used together. For instance, although a current NAL unit fails to include a slice of a reference picture according to the identification information, if it is used for inter-view prediction, the current NAL unit may be a reference picture used for inter-view prediction only. According to the identification information, if a current NAL unit includes a slice of a reference picture and used for inter-view prediction, the current NAL unit may be used for temporal prediction and inter-view prediction. If NAL unit fails to include a slice of a reference picture according to the identification information, it may be saved in a decoded picture buffer. This is because, in case that a coded picture of a current NAL unit is used for inter-view prediction according to the inter-view prediction flag information, it may be necessary to be saved.

Aside from a case of using both of the flag information and the identification information together, one identification information may indicate whether a coded picture of a current NAL unit is used for temporal prediction or/and inter-view prediction.

And, the inter-view prediction flag information may be used for a single loop decoding process. In case that a coded picture of a current NAL unit is not used for inter-view prediction according to the inter-view prediction flag information, decoding may be performed in part. For instance, intra-macroblock is completely decoded, whereas residual information of inter-macroblock is decoded only. Hence, it may be able to reduce complexity of a decoder. This can be efficient if it is unnecessary to reconstruct a video by specifically performing motion compensation in different views when a user is watching a video in a specific view only without watching a video in entire views.

Figure 3:
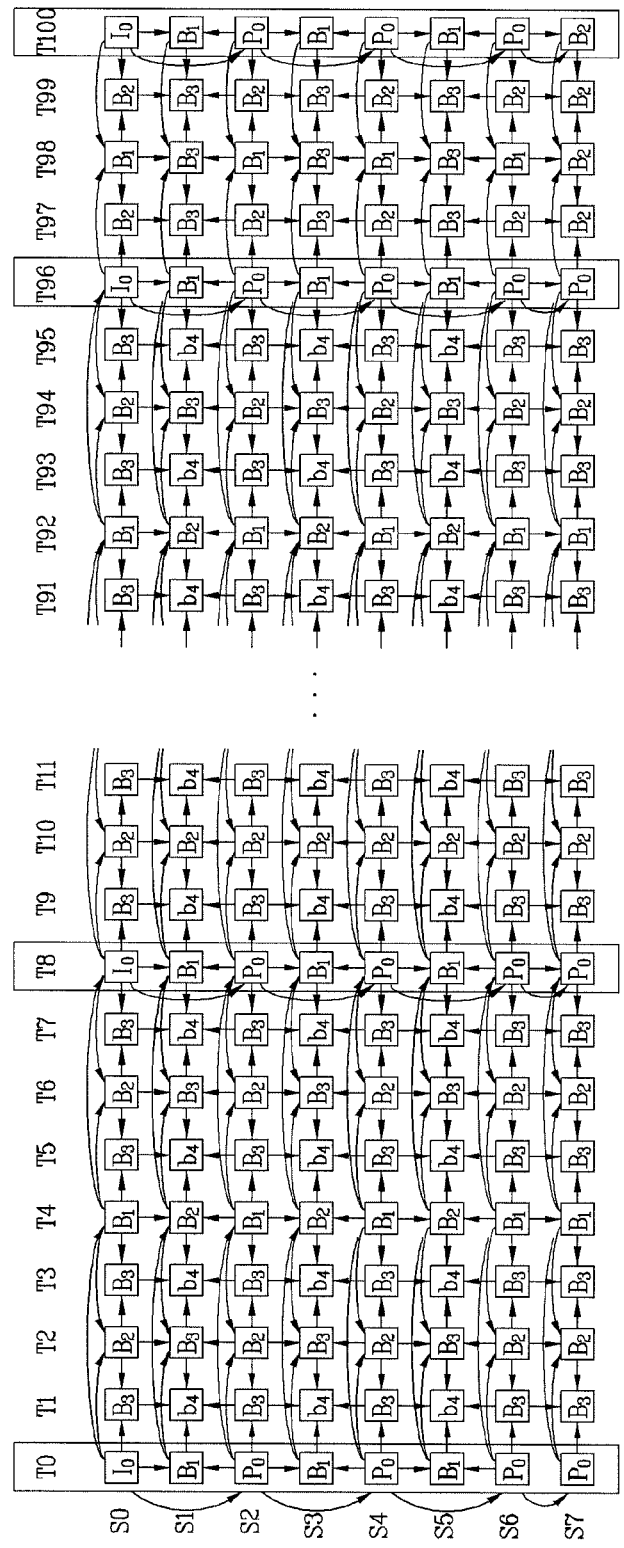
FIG. 3 is a diagram for an overall prediction structure of a multiview video signal according to an embodiment of the present invention to explain a concept of a random access picture.

The diagram shown in FIG. 3 is used to explain one embodiment of the present invention. For instance, a coding order may correspond to S0, S1 and S1 in considering a portion of the diagram shown in FIG. 3. Assume that a picture to be currently coded is a picture $B_3$ on a time zone T2 in a view S1. In this case, a picture $B_2$ on the time zone T2 in a view S0 and a picture $B_2$ on the time zone T2 in a view S2 may be used for inter-view prediction. If the picture $B_2$ on the time zone T2 in the view S0 is used for the inter-view prediction, the inter-view prediction flag information may be set to 1. If the picture $B_2$ on the time zone T2 in the view S0 is not used for the inter-view prediction, the flag information may be set to 0. In this case, if inter-view prediction flag information of all slices in the view S0 becomes 0, it may be unnecessary to decode the entire slices in the view S0. Hence, coding efficiency can be raised.

For another instance, if inter-view prediction flag information of all slices in the view S0 is not 0, i.e., if at least one is set to 1, decoding becomes mandatory even if a slice is set to 0. Since the picture $B_2$ on the time zone T2 in the view S0 is not used for decoding of a current picture, assuming that decoding is not executed by setting the inter-view prediction information to 0, it may be unable to reconstruct a picture $B_3$ on the time zone T1 in the view S0, which uses the picture $B_2$ on the time zone T2 in the view S0, and a picture $B_3$ on a time zone T3 in the view S0 in case of decoding slices in the view S0. Hence, they should be reconstructed irrespective of the inter-view prediction flag information.

For further instance, the inter-view prediction flag information may be usable for a decoded picture buffer (DPB). If the inter-view prediction flag information is not provided, the picture $B_2$ on the time zone T2 in the view S0 should be unconditionally saved in the decoded picture buffer. Yet, if it is able to know that the inter-view prediction flag information is 0, the picture $B_2$ on the time zone T2 in the view S0 may not be saved in the decoded picture buffer. Hence, it is able to save a memory of the decoded picture buffer.

Temporal level information means information on a hierarchical structure to provide temporal scalability from a video signal. Through the temporal level information, it is able to provide a user with a sequence on various time zones. Priority identification information may mean information capable of identifying a priority of NAL unit. It may be able to provide view scalability using the priority identification information. For example, it may be able to define view level information using the priority identification information. In this case, view level information may mean information on a hierarchical structure for providing view scalability from a video signal. In a multiview video, it may be necessary to define a level for a time and a level for a view to provide a user with video of various times and views. In case of defining such level information, it may be able to use scalability for time and view. Hence, a user may be able to watch a video of a desired time and view only or a video according to another condition for restriction only. The level information may be set different in various ways according to its referential condition. For instance, the level information may be set different according to camera position or camera alignment. And, the level information may be determined by considering view dependency.

For instance, a level for a view having a random access picture of picture-I is set to 0, a level for a view having a random access picture of picture-P is set to 1, and a level for a view having a fandom access picture of picture-B is set to 2. Thus, the level value can be assigned to the priority identification information. Moreover, the level information can be randomly set without being based on a special reference.

The entropy decoding unit 200 performs entropy decoding on a parsed bit stream and a coefficient of each macroblock, a motion vector and the like are then extracted. The dequantizing unit 200 obtains a coefficient value transformed by multiplying a received quantized value by a predetermined constant and the inverse transform unit 300 then transforms the coefficient value inversely to reconstruct a pixel value. Using the reconstructed pixel value, the intra-predicting unit 400 performs intra-picture prediction from a decoded sample within a current picture. Meanwhile, the deblocking filter unit 500 is applied to each coded macroblock to reduce block distortion. A filter may smooth a block edge to enhance an image quality of a decoded frame. Selection of a filtering process depends on a boundary strength and a gradient of an image sample around a boundary. Pictures through filtering are outputted or saved in the decoded picture buffer unit 600 to be used as reference pictures.

The decoded picture buffer unit 600 plays a role in storing or opening the previously coded pictures to perform inter-picture prediction. In doing so, in order to save the pictures in the decoded picture buffer unit 600 or to open the pictures, 'frame_num' of each picture and POC (picture order count) may be used. So, in MVC, since pictures in a view different from that of a current picture exists among the previously coded pictures, in order to use these pictures as reference pictures, view information for identifying a picture may be usable together with the 'frame_num' and the POC.

The decoded picture buffer unit 600 stores pictures that will be referred to for the coding of the current picture. And, the decoded picture buffer unit 600 constructs a list of reference pictures for the inter-picture prediction. In multiview video coding, inter-view prediction is possible. So, if a current picture refers to a picture in another view, it may be necessary to construct a reference picture list for the inter-view prediction. Moreover, it may be able to construct a reference picture list for performing both temporal prediction and inter-view prediction. For instance, if a current picture refers to a picture in a diagonal direction, it may be able to construct a reference picture list in the diagonal direction. In this case, there are various methods for constructing the reference picture list in the diagonal direction. For example, it may be able to define information (ref_list_idc) for identifying a reference picture list. If ref_list_idc=0, it may indicate a reference picture list for temporal prediction. If it is 1, it may indicate a reference picture list for inter-view prediction. If it is 2, it may indicate a reference picture list for both temporal prediction and inter-view prediction.

The reference picture list in the diagonal direction may be constructed using the reference picture list for the temporal prediction or the reference picture list for the inter-view prediction. For instance, it may be able to align reference pictures in a diagonal direction in a reference picture list for temporal prediction. Alternatively, it may be able to align reference pictures in a diagonal direction in a reference picture list for inter-view prediction. Thus, if lists in various directions are constructed, more efficient coding may be possible. In this disclosure, the reference picture list for the temporal prediction and the reference picture list for the inter-view prediction are mainly described. And, the concept of the present invention may be applicable to a reference picture list in a diagonal direction as well.

The decoded picture buffer unit 600 may use information on view in constructing the reference picture list for the inter-view prediction. For instance, inter-view reference information may be used. Inter-view reference information may mean information used to indicate an inter-view dependency relation. For instance, there can be a count of all views, a view identification number, a number of inter-view reference pictures, a view identification number of an inter-view reference picture and the like.

The decoded picture buffer unit 600 may include a variable deriving unit (not shown in the drawing), a reference picture list initializing unit 610 and a reference picture list modifying unit 620. The variable deriving unit (not shown in the drawing) may derive variables used for reference picture list initialization. For instance, it may be able to derive the variable using 'frame_num' indicating an identification number of a picture. In particular, a variable FrameNum and a variable FrameNumWrap may be usable for a short-term reference picture. First of all, the variable FrameNum may be equal to a frame_num value that is a syntax element. The variable FrameNumWrap may be used for the decoded picture buffer unit 600 to assign a small number to each reference picture and may be derived from the variable FrameNum. Using this derived variable FrameNumWrap, it may be able to derive a variable PicNum. In this case, the variable PicNum may mean an identification number of a picture used by the decoded picture buffer unit 600. In case of a long-term reference picture, it may be able to use a variable LongTermPicNum.

In order to create a reference picture list for inter-view prediction, it may be able to derive a $1^{st}$ variable (e.g., ViewNum) to create a reference picture list for inter-view prediction using the inter-view reference information. For instance, using view_id for identifying a view of a picture, it may be able to derive a $2^{nd}$ variable (e.g., ViewId). First of all, the $2^{nd}$ variable may be equal to a value of the view-id that is a syntax element. A $3^{rd}$ variable (e.g., ViewIdWrap) may be used for the decoded picture buffer unit 600 to assign a small view identification number to each reference picture and may be derived from the $2^{nd}$ variable. In this case, the $1^{st}$ variable ViewNum may mean a view identification number of an inter-view reference picture used by the decoded picture buffer unit 600. Yet, in the multiview video coding, since the number of reference pictures used for inter-view prediction may be relatively smaller than that of reference pictures used for temporal prediction, it may not define a separate variable to represent a view identification number of a long-term reference picture.

The reference picture list initializing unit 610 initializes a reference picture list using the above-mentioned variables. In doing so, a scheme of a reference picture list initializing process may vary in accordance with a slice type. For instance, in case of decoding a P slice, it may be able to assign a reference picture number based on a decoding order. In case of decoding a B slice, it may be able to assign a reference picture number based on a picture output order. In case of initializing a reference picture list for inter-view prediction, it may be able to assign a number to a reference picture based on the $1^{st}$ variable, i.e., a variable derived from view identification information of an inter-view reference picture. In doing so, the reference picture list may be created in a manner of discriminating an inter-view reference picture group and a non-inter-view reference picture group from each other.

The reference picture list modifying unit 620 plays a role in improving a compression ratio by assign a smaller number of a picture frequently referred to in the initialized reference picture list. A reference picture number for designating a reference picture may be coded by a unit of block. As a reference picture for coding of a reference picture number gets smaller, a code amounting to a smaller number of bits may be assigned. In doing so, inter-view reference information may be used to modify a reference picture list for inter-view prediction. For instance, in the process for modifying the reference picture list, a count information of inter-view reference pictures may be usable.

The reference picture managing unit (not shown in the drawing) manages reference pictures to realize inter-picture prediction more flexibly. For instance, a memory management control operation method and a sliding window method may be usable. This is to manage a reference picture memory and a non-reference picture memory by unifying the memories into one memory and to realize efficient memory management with a small memory. In multiview video coding, since pictures in a view direction have the same picture order count, information for identifying a view of each of the pictures may be usable in marking them. And, reference pictures managed in the above manner may be used by the inter-prediction unit 700.

The inter-prediction unit 700 may perform inter-picture prediction using the reference pictures saved in the decoded picture buffer unit 600. An inter-coded macroblock may be divided into macroblock partitions. Each of the macroblock partitions may be predicted from one or two reference pictures. The inter-prediction unit 700 compensates for a motion of a current block using informations transferred from the entropy decoding unit 100. Motion vectors of blocks neighbor to the current block are extracted from a video signal and a motion vector value of the current block is then obtained. And, the motion of the current block is compensated using the obtained motion vector predicted value and a differential vector extracted from the video signal. And, it may be able to perform the motion compensation using one reference picture or a plurality of pictures. In multiview video coding, in case that a current picture refers to pictures in different views, it may be able to perform motion compensation using information on the inter-view prediction reference picture list saved in the decoded picture buffer unit 600. And, it may be also able to perform motion compensation using view information for identifying a view of the corresponding picture. A direct prediction mode is an encoding mode for predicting motion information on a current block from motion information on a coding completed block. Since this method is able to save a count of bits required for decoding the motion information, compression efficiency may be enhanced. For instance, a temporal direct mode predicts motion information for a current block using motion information correlation in a temporal direction. In a manner similar to this method, the present invention may be able to predict motion information of a current block using motion information correlation in a view direction.

The inter-predicted pictures and the intra-predicted pictures by the above-explained processes are selected in accordance with a prediction mode to reconstruct a current picture.

FIG. 3 is a diagram of an overall prediction structure of a multiview video signal according to an embodiment of the present invention to explain a concept of an random access picture.

Referring to FIG. 3, T0 to T100 on a horizontal axis indicate frames according to time and S0 to S7 on a vertical axis indicate frames according to view. For instance, pictures at T0 mean sequences captured by different cameras on the same time zone T0, while pictures at S0 mean sequences captured by a single camera on different time zones. And, arrows in the drawing indicate predicted directions and orders of the respective pictures. For instance, a picture P0 in a view S2 on a time zone T0 is a picture predicted from I0, which becomes a reference picture of a picture P0 in a view S4 on the time zone T0. And, it becomes a reference picture of pictures B1 and B2 on time zones T4 and T2 in the view S2, respectively.

For a multiview video decoding process, an inter-view random access may be required. So, an access to a random view should be possible by minimizing the decoding effort. In this case, a concept of a random access picture may be needed to realize an efficient access. The definition of the random access picture is mentioned in FIG. 2. For instance, in FIG. 3, if a picture I0 in a view S0 on a time zone T0 corresponds to a random access picture, all pictures in different views on the same time zone, i.e., the time zone T0 can correspond to the random access picture. For another instance, if a picture 10 in a view S0 on a time zone T8 corresponds to a random access picture, all pictures in different views on the same time zone, i.e., the time zone T8 can correspond to the random access picture. Likewise, all pictures in T16, . . . , T96, and T100 become an example of the random access picture as well.

According to another embodiment, in an overall prediction structure of MVC, GOP may start with a picture-I. And, the picture-I is compatible with H.264/AVC. So, all random access pictures compatible with H.264/AVC can become the picture-I. Yet, in case of replacing the pictures-I by picture-P, more efficient coding is possible. In particular, more efficient coding is enabled using a prediction structure that GOP is made to start from picture-P compatible with H.264/AVC.

In this case, if the random access picture is re-defined, it may become a coded picture capable of referring to a slice on a different time zone in a same view as well as a slice that all slices exist in a frame on a same time zone. Yet, the case of referring to a slice on a different time zone in a same view may be limited to a random access picture compatible with H.264/AVC only.

After the random access picture has been decoded, all of the sequentially coded pictures are decoded from the picture decoded ahead of the random access picture in an output order without inter-prediction.

Considering the overall coding structure of the multiview video shown in FIG. 3, since inter-view reference information of a random access picture differs from that of a non-random access picture, it may be necessary to discriminate the random access picture and the non-random access picture from each other according to the random access flag information.

The inter-view reference information may mean information indicating what kind of structure is used to predict inter-view videos. This may be obtained from a data region of a video signal. For instance, it can be obtained from a sequence parameter set region. And, the inter-view reference information can be obtained using the number of reference pictures and view information of the reference pictures. For instance, after a count of all views has been obtained, it may be able to obtain view identification information for identifying each view based on the count of all views. And, count information of inter-view reference pictures, which indicates a count of reference pictures for a reference direction of each view, can be obtained. And, it may be able to obtain view identification information of each inter-view reference picture in accordance with the count information of the inter-view reference pictures. Through this method, the inter-view reference information may be obtained. And, the inter-view reference information may be obtained in a manner of being categorized into a case of a random access picture and a case of a non-random access picture. This can be known using random access picture identification information indicating whether a coded slice in a current NAL corresponds to a random access picture. The random access picture identification information may be obtained from an extension region of NAL header or a slice layer region.

Moreover, the inter-view reference information obtained in accordance with the random access picture identification information may be usable for construction, modification and the like of a reference picture list.

Figure 4:
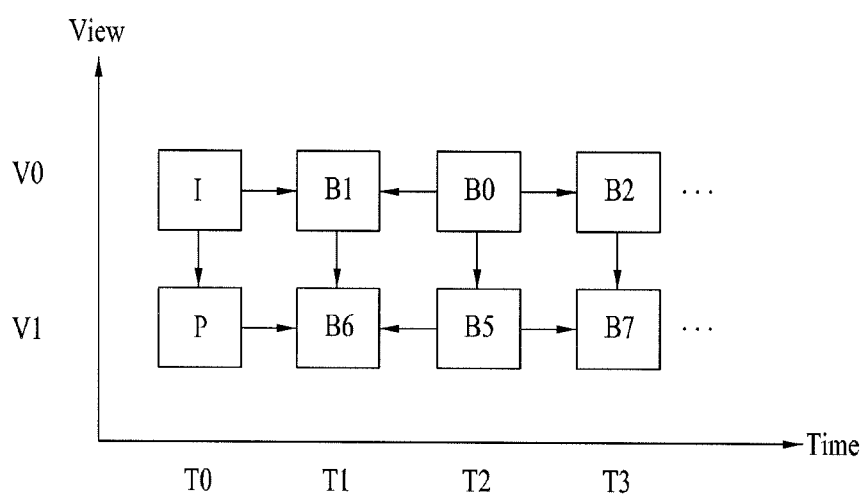
FIG. 4 is a diagram for a prediction structure of a stereo video according to an embodiment of the present invention.

FIG. 4 is a diagram for a prediction structure of a stereo video according to an embodiment of the present invention.

If a user intends to decode two views only from the multi-view video prediction structure shown in FIG. 3, a prediction structure shown in FIG. 4 may be provided. In this case, the two views may include a base view and a non-base view. In this case, a base view may mean a view that can be coded independently from other views. Alternatively, a base view may mean at least one view for compatibility with a conventional decoder (e.g., H.264/AVC, MPEG-2, MPEG-4, etc.). The base view can become a base of coding in multi-views. Alternatively, the base view may correspond to a reference view for prediction of a different view. A sequence corresponding to the base view is encoded by sequence codec scheme (MPEG-2, MPEG-4, H.26L series, etc.) to be formed as an independent bitstream. The sequence corresponding to the base view may or may not be compatible with H.264/AVC. Yet, a sequence in a view compatible with H.264/AVC becomes a base view. And, the non-base view may mean a view that is not the base view.

Referring to FIG. 4, T0 to T3 on a horizontal axis indicate frames according to times and V0 and V1 on a vertical axis may indicate frames according to views, respectively. Arrows shown in the drawing may indicate prediction directions of pictures, respectively. And, a numeral within each picture is one example of indicating a decoding order only. Thus, assuming that two views exist only, one view V0 may become a base view and the other view V1 may become a non-base view. Hence, the reference view V0 may be usable as a reference view of the non-base view V1 but the non-base view V1 is unable to become a reference view of another view. This is because the base view V0 is an independently codable view. Therefore, if a stereo video is decoded, it may be able to raise coding efficiency by restricting coding of informations necessary for multiview video coding.

In the following description, embodiments for the above description shall be explained in detail with reference to FIGS. 5 to 7.

FIGS. 5 to 7 are diagrams of syntax for limiting coding of multiview video coding informations in decoding a stereo video according to embodiments of the present invention.

In case that a profile identifier of a received bitstream indicates a bitstream coded as a stereo video, the received bitstream may include 2 view videos. In this case, the inter-view reference information described with reference to FIG. 2 may indicate information on the 2 view videos. Information indicating a count of all views in the inter-view reference information may have a value that always indicates 2 views only. Hence, the information indicating the view count obtained from an extension region of a sequence parameter needs not to be always sent. In particular, only if the profile identifier of the received bitstream does not indicate a bitstream coded as a stereo video, the corresponding information may be transmitted.

Referring to FIG. 5, it may be able to check whether a profile identifier of a received bitstream indicates a bitstream coded as a stereo video [S520]. If the profile identifier indicates the bitstream coded as the stereo video, it may be able to skip the coding of information (num_views_minus1) indicating a count of all views. On the contrary, if the profile identifier of the received bitstream does not indicate the bitstream coded as the stereo video, i.e., if the profile identifier indicates a bitstream coded as a multiview video, decoding may be performed by extracting information indicating the count of all views [S530]. In this case, the information indicating the count of all views may include the information indicating at least 3 view videos. And, the information indicating the view count may be obtained from an extension region of a sequence parameter [S510].

According to another embodiment of the present invention, if a profile identifier of a received bitstream indicates a bitstream coded as a stereo video, information related to a direction L1 in inter-view reference information may not be transmitted in some cases.

If the profile identifier of the received bitstream indicates a bitstream coded as a stereo video, the received bitstream may include 2 view videos. In this case, as mentioned in the foregoing description with reference to FIG. 4, in case of a non-base view V1 that refers to the base view V0, there exists an inter-view reference picture in a direction L0 only. In particular, since the count of all views is 2 only, both an inter-view reference picture in the direction L0 and an inter-view reference picture in the direction L1 may not exist. Hence, the information related to the direction L1 in the inter-view reference information needs not to be always transmitted. In particular, only if the profile identifier of the received bitstream does not indicate a bitstream coded as a stereo video, the corresponding information may be set to be transmitted. In doing so, the information related to the direction L1 may be considered in a manner of being classified into a case of a random access picture and a case of a non-random access picture.

Referring to FIG. 6, count information of all views may be extracted from an extension region of a sequence parameter [S610, S620]. In accordance with the count information of all views, view identification information of each of the views may be extracted [S630]. In accordance with the count information of all views, count information of reference views for a direction L0 of a random access picture of each view may be extracted [S641]. In accordance with the count information of the reference views for the direction L0 of the random access picture, view identification information of the reference view for the direction L0 of the random access picture may be extracted [S642]. In the same manner of the step S641 and the step S642, information on a direction L1 may be extracted [S644, S655]. In doing so, it may be able to check whether a profile identifier of a received bitstream indicates a bitstream coded as a stereo video [S643]. If the profile identifier indicates the bitstream coded as the stereo video, it may be able to skip the extraction of the information on the direction L1. On the contrary, if the profile identifier does not indicate the bitstream coded as the stereo video, the information on the direction L1 may be extracted [S644, S645].

Moreover, the above-mentioned steps S641 to S645 may be identically applicable to a non-random access picture. This is shown in the steps S651 to S655 almost identical to the former steps S641 to S645, of which details shall be omitted from the following description.

According to another embodiment of the present invention, which is different from the former description with reference to FIG. 5 and FIG. 6, if a profile identifier of a received bitstream indicates a bitstream coded as a stereo video [S720], the inter-view reference information described with reference to FIG. 2 is not transmitted but another information is transmitted to replace the inter-view reference information.

For instance, this transmitted information may include one of each view identification information (view_id[i]) of all views [S730, S740], flag information (anchor_ref_flag) indicating whether a random access picture is used for inter-view prediction [S750], and flag information (non_anchor_ref_flag) indicating whether a non-random access picture is used for inter-view prediction [S760]. In this case, the 2 flag informations may be meaningful only if a random access picture or a non-random access picture corresponds to a base view. If a random access picture or a non-random access picture corresponds to a base view, since it may not be used as a reference picture, the 2 flag informations may always have a value set to 'false'.

In particular, if a profile identifier of a received bitstream indicates a bitstream coded as a stereo video, since a count of al views may be always 2, it may be unnecessary to transmit the corresponding information. Moreover, since the base view V0 is independently codable without referring to another view, as mentioned in the foregoing description with reference to FIG. 4, inter-view reference information may be unnecessary. Since the non-base view V1 is able to use the base view V0 as a reference view only, it may not be necessary to send a count of reference views for a direction L0/L1 and view identification information of the reference views all.

Hence, only if a profile identifier of a received bitstream does not indicate a bitstream coded as a stereo video [S710], coding efficiency may be enhanced by extracting inter-view reference information of a multiview video.

Thus, by checking a presence or non-presence of a bitstream coded as a stereo video using a profile identifier, it may be able to adaptively utilize inter-view reference information of a multiview video. In the following description, an embodiment of decoding using the adaptively obtained inter-view reference information shall be explained.

Figure 8:
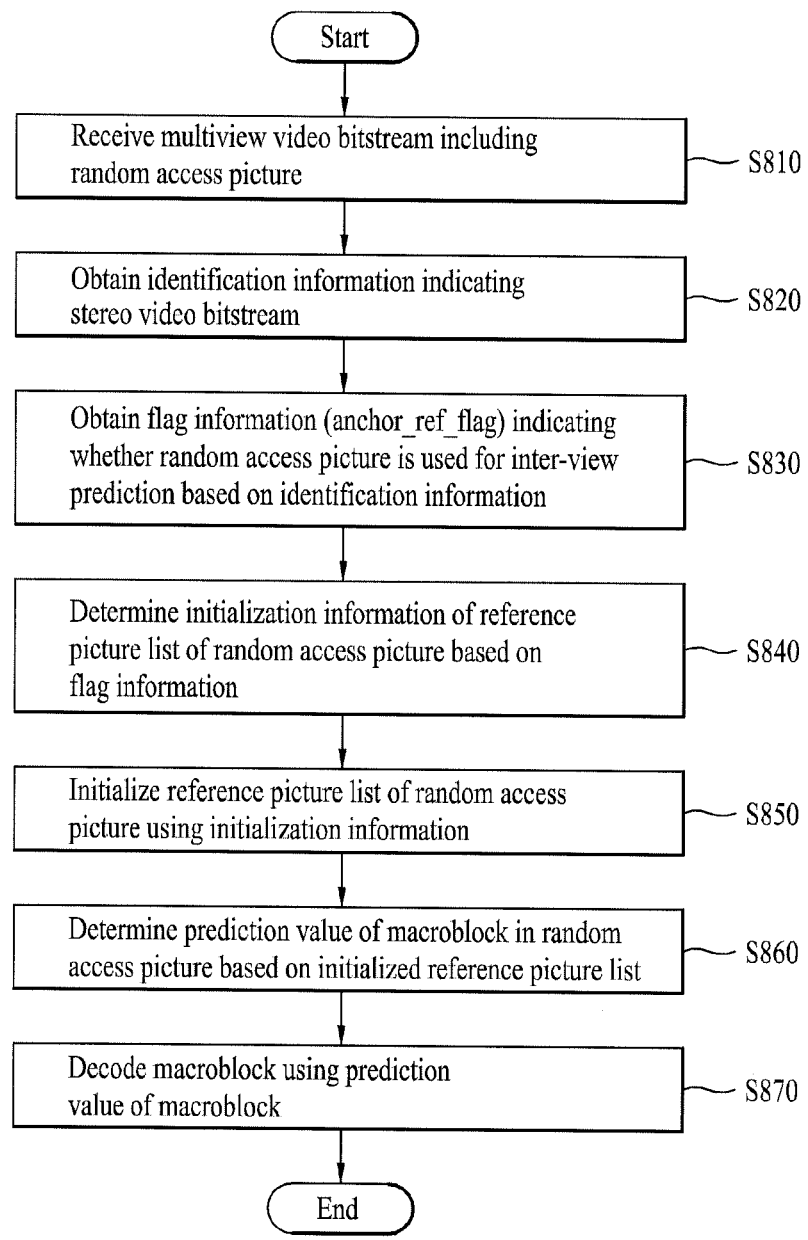
FIG. 8 is a flowchart of a decoding process using an inter-view reference information of a bitstream coded as a stereo video according to an embodiment of the present invention.

FIG. 8 is a flowchart of a decoding process using an inter-view reference information of a bitstream coded as a stereo video according to an embodiment of the present invention.

First of all, a multiview video stream including a random access picture and a non-random access picture may be received [S810]. In this case, the random access picture includes a random access slice. And, the random access slice indicates a slice that refers to a slice existing at the same time in a different view only. The non-random access picture indicates a picture that is not the random access picture. This may be determined in accordance with a random access flag in an extension region of a NAL unit header to be currently coded. This has been described in detail with reference to FIG. 2. Subsequently, it may be able to receive identification information indicating that the received multiview video bitstream is a stereo video bitstream [S820]. Based on the identification information, it may be able to obtain flag information (anchor_ref_flag) indicating whether the random access picture is used for inter-view prediction or flag information (non_anchor_ref_flag) indicating whether the non-random access picture is used for inter-view prediction [S830].

In accordance with the flag information, if the random access picture is used for the inter-view prediction, it may be able to determine initialization information of a reference picture list of the random access picture [S840]. In this case, the initialization information may include view identification information of reference view and count information of reference views. Using the initialization information, the reference picture list of the random access picture may be initialized [S850]. Based on the initialized reference picture list, it may be able to determine a prediction value of a macroblock in the random access picture [S860]. And, the macroblock may be coded using the prediction value of the macroblock [S870].

Although the above embodiment is described by taking a case that a macroblock to be currently coded corresponds to a random access picture as an example, if the macroblock to be currently coded corresponds to a non-random access picture, a similar process may be performed based on the flag information (non_anchor_ref_flag) indicating whether the non-random access picture is used for inter-view prediction As mentioned in the foregoing description, a video according to the present invention may be provided to a transmitter/receiver for multimedia broadcasting such as DMB (digital multimedia broadcast) to be used in decoding video and data signals and the like. And, the multimedia broadcast transmitter/receiver may include a mobile communication terminal.

A decoding/encoding method according to the present invention may be configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

INDUSTRIAL APPLICABILITY

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

FIG. 1
stereo profile
entropy decoding unit 100, dequantizing unit 200, inverse transform unit 300, intra-prediction unit 400, deblocking filter unit 500, decoded picture buffer unit 600, reference picture list modifying unit 620, reference picture list initializing unit 610, inter-prediction unit 700

FIG. 2
view identification information
random access flag information
inter-view prediction flag information
bitstream identification information
inter-view reference information
ex.)
1) Count of all views
2) Count of inter-view reference picture
(Case of List0/List1, Case of random access picture/non-random access picture)
3) View number of interview reference picture
(Case of List0/List1, Case of random access picture/non-random access picture)

FIG. 8
Start
Receive multiview video bitstream including random access picture 5810

Obtain identification information indicating stereo video bitstream S820

Obtain flag information (anchor_ref_flag) indicating whether random access picture is used for inter-view prediction based on identification information 5830

Determine initialization information of reference picture list of random access picture based on flag information 5840

Initialize reference picture list of random access picture using initialization information 5850

Determine prediction value of macroblock in random access picture based on initialized reference picture list S860

Decode macroblock using prediction value of macroblock 5870

End

What is claimed is:

1. A method of processing a multi-view video stream, the method comprising:
receiving the multi-view video stream including at least one random access picture, the at least one random access picture including a random access slice, the random access slice indicating a slice referring to slices existing at a same time in a different view only;
receiving identification information indicating that the received multi-view video stream is a stereo video bitstream;
obtaining flag information on the identification information, the flag information indicating whether a random access picture of a base view is used for inter-view prediction of a random access picture of a non-base view;
determining initialization information of a reference picture list of the random access picture of the non-base view based on the flag information;
initializing the reference picture list of the random access picture of the non-base view using the initialization information;
determining a prediction value of a macroblock in the random access picture of the non-base view based on the initialized reference picture list; and
decoding the macroblock using the prediction value of the macroblock,
wherein the base view indicates an independently decoded view, and the non-base view indicates a view other than the base view.

2. The method of claim 1, wherein the flag information is obtained based on a value indicating a decoding order among a plurality of views.

3. The method of claim 1, wherein the initialization information includes view identification information of a reference view and count information of the reference view.

4. The method of claim 3, wherein if the random access picture of the base view is not used for the inter-view prediction of the random access picture of the non-base view in accordance with the flag information, the view identification information of the reference view is set to the view identification information of a first-decoded view and the count information of the reference view is set to a value indicating one.

5. The method of claim 1, wherein the flag information is obtained from an extension region of a sequence header.

6. An apparatus configured to process a multi-view video stream, the apparatus comprising:
a decoder circuit configured to:
receive the multi-view video stream including at least one random access picture, the at least one random access picture including a random access slice, the random access slice indicating a slice referring to slices existing at a same time in a different view only,
receive identification information indicating that the received multi-view video stream is a stereo video bitstream,
obtain flag information on the identification information, the flag information indicating whether a random access picture of a base view is used for inter-view prediction of a random access picture of a non-base view,
determine initialization information of a reference picture list of the random access picture of the non-base view based on the flag information,
initialize the reference picture list of the random access picture of the non-base view using the initialization information,
determine a prediction value of a macroblock in the random access picture of the non-base view based on the initialized reference picture list, and
decode the macroblock using the prediction value of the macroblock,
wherein the base view indicates an independently decoded view, and the non-base view indicates a view other than the base view.

7. The apparatus of claim 6, wherein the flag information is obtained based on a value indicating a decoding order among a plurality of views.

8. The apparatus of claim 6, wherein the initialization information includes view identification information of a reference view and count information of the reference view.

9. The apparatus of claim 8, wherein if the random access picture of the base view is not used for the inter-view prediction of the random access picture of the non-base view in accordance with the flag information, the view identification information of the reference view is set to the view identification information of a first-decoded view and the count information of the reference view is set to a value indicating one.

10. The method of claim 1, wherein the base view further indicates the independently decoded view without referring to a different view.

11. The apparatus of claim 6, wherein the base view further indicates the independently decoded view without referring to a different view.

* * * * *